2,946,784

CYCLOPENTANOPHENANTHRENE DERIVATIVES AND PROCESS

George Rosenkranz, Jesus Romo, and Carl Djerassi, Mexico City, Mexico, assignors to Syntex S.A., Mexico City, Mexico, a corporation of Mexico No Drawing. Original application Oct. 24, 1950, Ser. No. 191,942, now Patent No. 2,858,307, dated Oct. 28, 1958. Divided and this application Mar. 7, 1958, Ser. No. 724,492

4 Claims. (Cl. 260—239.55)

The present invention relates to cyclopentanoperhydrophenanthrene derivatives and process.

More particularly the present invention deals with the production of certain novel steroidal sapogenin compounds unsaturated in the 7-8 position.

This application is a division of our application Serial No. 191,942, filed October 24, 1950, now U.S. Patent No. 2,858,307.

Compounds of the character just described, which may be generally designated as $\Delta^7$-22-spirosten-3$\beta$-ol derivatives are unknown in nature and are of very substantial value since they represent key intermediates for the direct introduction of an oxygen function at C-11 in steroids which possess no substituents in ring C. In addition, these derivatives are useful intermediates since the degradation of the sapogenin side chain leads to the production of new pregnane derivatives of potential therapeutic value.

In application Serial No. 191,941, filed October 24, 1950, now patent No. 2,867,616, there is disclosed a novel process for the production of $\Delta^{5,7}$-22-isospirostadien-3$\beta$-ol (7-dehydro diosgenin) and/or the esters thereof, as for example the acetate. Compounds of this character are produced in accordance with the aforementioned application by selective bromination of various steroidal sapogenins possessing the spiro-ketal side chain at positions 16 and 17 and also provided with a 3-hydroxy group or the equivalent ester thereof as well as a double bond at the 5-position. As pointed out in this previous application, sapogenins of this character are diosgenin and other sapogenins of the 22-iso series as well as the corresponding 22 normal compounds, as for example yamogenin. Dehydrobromination of the compound selectively brominated at the 7 position yields the $\Delta^{5,7}$-22-isospirostadien-3$\beta$-ol or, for example, the acetate thereof which forms the starting material for the compounds of the present invention.

In accordance with the present invention it has been found that when the aforementioned compound is hydrogenated in the presence of a platinum oxide catalyst the double bond at the 5-position is saturated and from 7-dehydrodiosgenin the corresponding $\Delta^7$-isoallospirosten-3$\beta$-ol is produced.

It has been further found in accordance with the present invention that when $\Delta^{5,7}$-22-isospirostadien-3$\beta$-ol or the acetate thereof or other suitable ester is dehydrogenated with mercuric acetate in chloroform acetic acid a double bond is introduced into the compound at the 9-11 position of ring C to yield $\Delta^{5-6; 7-8; 9-11}$-22-isospirostatrien-3$\beta$-ol and/or the equivalent ester. This, of course, introduces a double bond into the 9-11 position of the ring C and it produces a compound which is desirable for the direct chemical or biochemical introduction of an oxygen function into this hitherto inaccessible position.

In accordance with the present invention it has also been discovered that dehydrogenation of $\Delta^7$-22-isoallospirosten-3$\beta$-ol with mercuric acetate in chloroform acetic acid also results in the introduction of a double bond in the 9-11 position to produce the novel $\Delta^{7-8; 9-11}$-22-isoallospirostadien-3$\beta$-ol or the equivalent esters thereof.

Compounds of the character just described have also been found to be subjected to degradation insofar as the side chain is concerned so that the treatment of $\Delta^7$-22-isoallospirosten-3$\beta$-ol with acetic anhydride at an elevated temperature, as for example 200° C. results in the production of the corresponding $\Delta^{7,20}$-allofurostadien-3$\beta$,26-diol ($\psi$-$\gamma$-diosgenin). The novel compounds may also be further reacted in other ways, for example $\Delta^7$-22-isoallospirosten-3$\beta$-ol and/or esters thereof may be subjected to rearrangement of the double bond by treatment with a paladium catalyst in the presence of acetic acid and the double bond rearranges to yield the isomeric $\Delta^{8,14}$ corresponding compound.

A further example of the reactions according to the present invention is the reaction of $\Delta^{7-8; 9-11}$-22-isoallospirostadien-3$\beta$-ol with a peracid to yield an oxide which is believed to have the $\Delta^7$-9,11-oxido structure. In general certain of the novel compounds according to the present invention may be typified by the following structural formula:

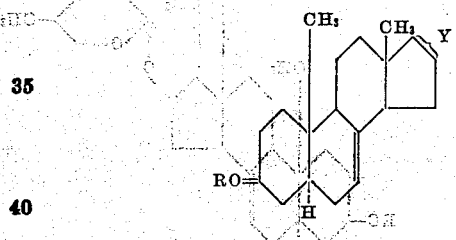

In the foregoing formula, R is selected from the group consisting of hydrogen and an acyl group, i.e, the residue of an aliphatic or aromatic acid, as for example acetic or benzoic acid residues, although other esters of other organic acids may be thus represented. In the foregoing formula Y is selected from the group consisting of:

and

It is to be understood that in the above indicated ring structure the compounds may be additionally unsaturated in the 9-11 position or they may be additionally unsaturated in the 5-6 and 9-11 positions. Further the ring may have other substituents characteristic of the naturally occurring sapogenins. The novel process for the production of certain of the above exemplified compounds may be indicated in accordance with the following equation:

then dissolved in a suitable solvent such as ethyl acetate and shaken with palladium-on-charcoal catalyst in an atmosphere of hydrogen in the presence of acetic acid the

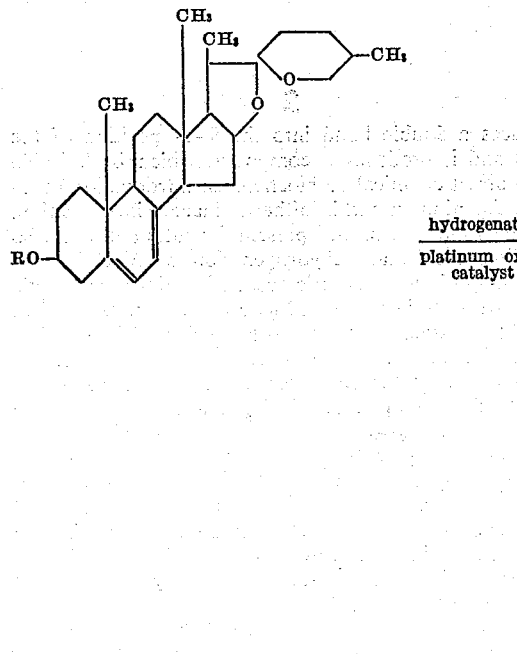

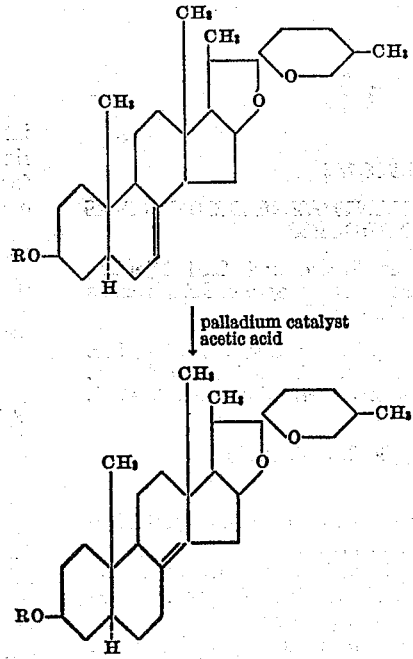

In the above equation, R as previously set forth may be hydrogen or the residue of a suitable organic acid such as a fatty acid or an aromatic acid. The first step of the above process may be carried out by selectively hydrogenating the $\Delta^{5,7}$-22-isospirostadien-3β-ol or a suitable ester thereof such as its acetate with platinum oxide double bond was rearranged to produce the corresponding $\Delta^{8-14}$ compound.

$\Delta^7$ compounds, in accordance with the present invention, which possess additional double bonds as in the 9–11 position of the ring, may be produced by a process exemplified by the following equations:

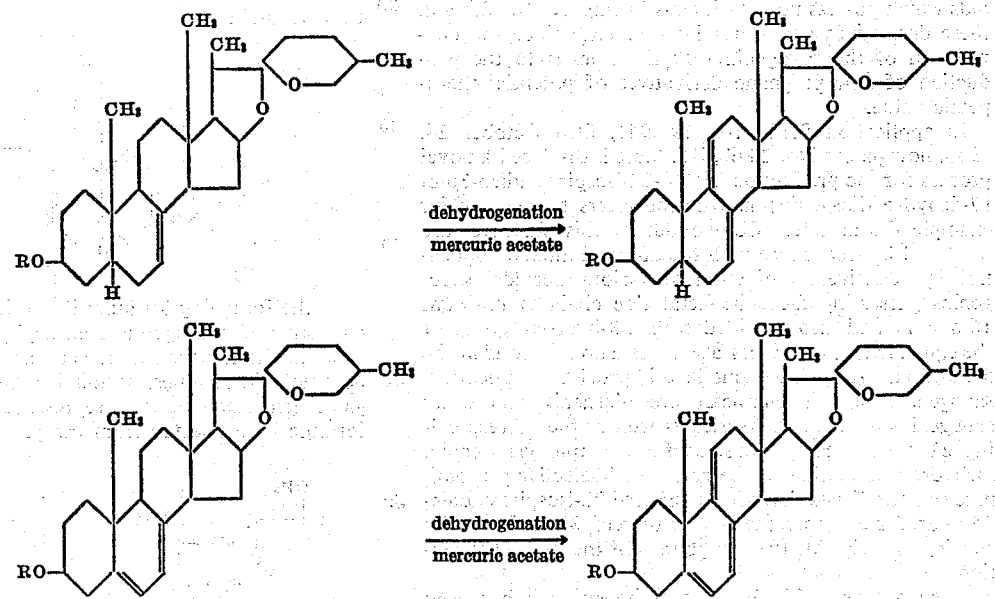

in ethyl acetate solution to yield the desired $\Delta^7$-22-isoallospirosten-3-β-ol derivative. In general the reaction can be carried out by dissolving the steroid compound just referred to in a suitable solvent such as ethyl acetate and shaking the same in contact with platinum oxide catalyst in a hydrogen atmosphere until the gas take-up corresponded to exactly one mol, i.e. for a period of time of approximately forty-five minutes. The catalyst can then be filtered and the filtrate concentrated and cooled to crystallize the product which can then be recrystallized from a suitable solvent or mixture of solvents such as chloroform methanol. If the compound thus produced is In the above reactions the appropriate steroid, as for example $\Delta^{5,7}$-22-isospirostadien-3β-ol or $\Delta^7$-22isoallospirosten-3β-ol, is dehydrogenated by dissolving the same in a suitable solvent, as for example chloroform, and treated with mercuric acetate and glacial acetic acid by shaking the same at room temperature for a long period of time, as for example twenty hours. Thereafter the solution produced is filtered, more chloroform is added and the acetone is removed by washing with water and a suitable carbonate. The solution is then dried and evaporated to produce the equivalent compounds additionally unsaturated in the 9–11 position.

Compounds of the character above described and produced in accordance with the preceding equations can be partially degraded to the corresponding furostadien compounds as exemplified by the following equation:

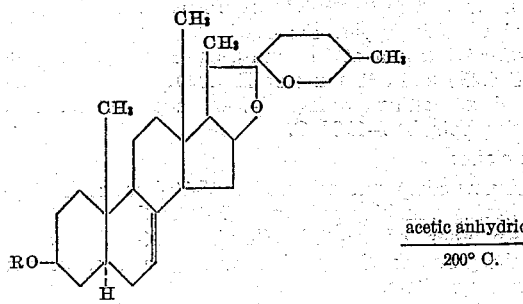

Proceeding in accordance with the above equation, the steroid compound, as for example Δ⁷-22-isoallospirosten-3β-ol, is heated with acetic anhydride in a bomb-tube at 200° C. for approximately eight hours. The acetic anhydride is then hydrolyzed with water and the product extracted with ether, washed with water, dried and evaporated. The oily residue produced was then saponified by refluxing with alcoholic potassium hydroxide to produce the desired Δ⁷,²⁰-allofurostadien-3β,26-diol.

The 9–11 unsaturated compounds may be treated with a peracid to form the corresponding 9–11 oxides in accordance with the following equation:

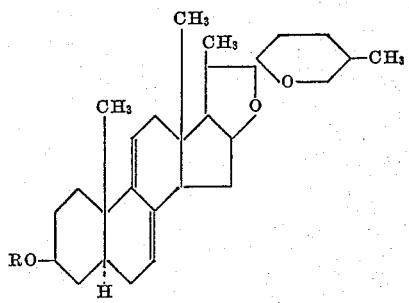

In accordance with the above equation, as for example Δ⁷⁻⁸:⁹⁻¹¹-22-isoallospirostadien-3β-ol acetate is dissolved in chloroform and mixed with an ethereal solution of for example monoperphthalic acid or perbenzoic acid. It was then maintained at a low temperature, as for example 0° for twenty hours. The reaction mixture is then washed with sodium carbonate solution in water, the organic layer evaporated to dryness and the solid thus produced recrystallized from a suitable solvent such as methanol chloroform. A product was produced believed to be the 9–11-oxido compound, i.e. Δ⁷-22-isoallo-9,11-oxidospirosten-3β-ol 3-acetate.

In all of the above equations R, as previously pointed out, may be hydrogen or may be a suitable acyl group. Although in the above equations the iso compounds have been indicated as an example, the same reactions may be performed with the normal 22 compounds. This is especially true, since on partial degradation the same furostadien is formed from either isomer.

The following specific examples serve to illustrate the present invention but are not intended to limit the same:

*Example I*

A solution of 2.0 g. of Δ⁵,⁷-22-isospirostadien-3β-ol 3-acetate in 100 cc. of ethyl acetate was shaken with 100 mg. of platinum oxide catalyst for forty-five minutes in a hydrogen atmosphere during which time the gas up-take corresponded to exactly one mol. Part of the product which had crystallized out was redissolved by warming, the catalyst was filtered and the filtrate concentrated and cooled. The colorless crystals were filtered and recrystallized from chloroform-methanol. Δ⁷-22-isoallospirosten-

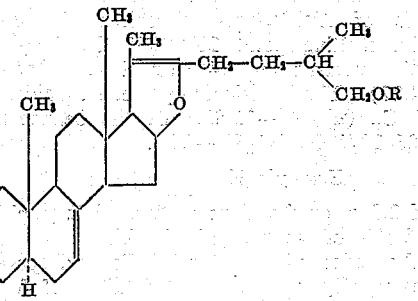

3β-ol 3-acetate had melting point 222–223° C., (α)$_D^{20}$ −66.5° (chloroform). Saponification produced the free alcohol with melting point 189–192° C., (α)$_D^{20}$ −76°, and benzoylation the benzoate with melting point 221–223° C.

*Example II*

One gram of the above acetate of Example I in 150 cc. of ethyl acetate and 2 cc. of acetic acid was shaken with 100 mg. of palladium-on-charcoal catalyst in an atmosphere of hydrogen for twenty-four hours. The reaction could also be carried out in pure acetic acid, but in neither case was any hydrogen absorbed. After removal of the catalyst and evaporation of the filtrate to dryness, the residue was recrystallized from ethyl acetate-methanol. Δ⁸⁻¹⁴-22-isoallospirosten-3β-ol 3-acetate was obtained in nearly quantitative yield with melting point 197–198° C., (α)$_D^{20}$ −72.4° (chloroform). Saponification produced the free alcohol, melting point 186–189° C., and benzoylation the benzoate with melting point 208–210° C.

*Example III*

A solution of 6.0 g. of Δ⁷-22-isoallospirosten-3β-ol 3-acetate of Example I in 24 cc. of acetic anhydride was heated in a bomb tube at 200° for eight hours. The acetic anhydride was hydrolyzed with water, the product extracted with ether, washed with water, dried and evaporated. The oily residue was saponified by refluxing with 10 g. of potassium hydroxide and 200 cc. of methanol for one hour. After cooling and diluting with the water, the product was extracted with ether, washed to neutral with water, dried and concentrated to incipient crystallization. Filtration and recrystallization from hexane-acetone gave Δ⁷,²⁰-allofurostadien-3β,26-diol as pale tan crystals with melting point 175–177° C. (Kofler block), 190–192° (capillary).

*Example IV*

A mixture of 12.0 g. of Δ⁷-22-isoallospirosten-3β-ol 3-acetate of Example I, 160 cc. of chloroform, 20 g. of mercuric acetate and 250 cc. of glacial acetic acid was shaken mechanically at room temperature for twenty hours. The yellow solution was filtered, more chloroform was added and then washed thoroughly with water and carbonate to remove all acid, dried and evaporated. Recrystallization of the residue from methanol yielded colorless crystals of $\Delta^{7-8;9-11}$-22-isoallospirostadien-3$\beta$-ol 3-acetate with melting point 205–206° C., $(\alpha)_D^{20}$ −21°, ultra-violet maxima at 234 (log E 4.17) and 242 mu (log E 4.22). The free alcohol possessed melting point 177–179° C., $(\alpha)_D^{20}$ −35.8°, and the benzoate melting point 206–207° C., $(\alpha)_D^{20}$ −24.6.

Example V

A solution of 2.0 g. of the diene acetate of Example IV in 30 cc. of chloroform was mixed with 14 cc. of a 0.7 N ethereal solution of monoperphthalic acid (perbenzoic acid was equally satisfactory) and left at 0° for twenty hours. After washing with sodium carbonate solution and water, the organic layer was evaporated to dryness and the solid recrystallized from methanol-chloroform. The shiny plates had melting point 270–272° C., $(\alpha)_D^{20}$ −78.45° and most likely represent $\Delta^7$-22-isoallo-9,11-oxidospirosten-3$\beta$-ol 3-acetate.

Example VI

The mercuric acetate dehydrogenation of $\Delta^{5,7}$-22-isospirostadien-3$\beta$-ol 3-acetate was carried out exactly as described for the mono-unsaturated analog in Example IV and lead after recrystallization from methanol-ethyl acetate to $\Delta^{5;7-8;9-11}$-22-isospirostatrien-3$\beta$-ol 3-acetate with melting point 176–178° C., $(\alpha)_D^{20}$ +168.3°, ultra-violet maxima at 310 mu (log E 4.18), 324 mu (log E 4.23) and 338 mu (log E 4.02). The free alcohol had a melting point 187–190° and the benzoate a melting point 197–198° C.

We claim:

1. A new compound comprising $\Delta^7$-22-isoallospirosten-3$\beta$-ol having a melting point of 189–192° C.
2. An ester of $\Delta^7$-22-isoallospirosten-3$\beta$-ol selected from the group consisting of lower fatty acid esters and the benzoate esters.
3. A new compound comprising $\Delta^7$-22-isoallospirosten-3$\beta$-ol 3-acetate having a melting point of 222–223° C.
4. A new compound comprising $\Delta^7$-22-isoallospirosten-3$\beta$-ol 3-benzoate having a melting point of 221–223° C.

No references cited.